(12) United States Patent
Kassal et al.

(10) Patent No.: US 6,963,690 B1
(45) Date of Patent: Nov. 8, 2005

(54) TERMINATION CLAMP ASSEMBLY FOR A HYBRID ELECTRICAL/FIBER OPTIC CABLE

(75) Inventors: James J. Kassal, North Kingstown, RI (US); Richard W. Ranlet, North Kingstown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/834,159

(22) Filed: Apr. 26, 2004

(51) Int. Cl.[7] .............................................. G02B 6/00
(52) U.S. Cl. ...................................... 385/139; 385/137
(58) Field of Search ................................ 385/134, 137, 385/139

(56) References Cited

U.S. PATENT DOCUMENTS

| | | | |
|---|---|---|---|
| 5,078,515 A * | 1/1992 | Soulard et al. | ................ 385/89 |
| 5,133,040 A | 7/1992 | Egner | |
| 5,381,501 A | 1/1995 | Cardinal et al. | |
| 5,388,174 A * | 2/1995 | Roll et al. | ..................... 385/80 |
| 5,471,555 A | 11/1995 | Braga et al. | |
| 6,421,493 B1 | 7/2002 | Burek et al. | |
| 6,571,048 B1 | 5/2003 | Bechamps et al. | |
| 6,729,773 B1 * | 5/2004 | Finona et al. | ................. 385/86 |
| 2003/0045149 A1 * | 3/2003 | Chang | ........................ 439/271 |

* cited by examiner

Primary Examiner—John D. Lee
Assistant Examiner—Tina M. Wong
(74) Attorney, Agent, or Firm—James M. Kasischke; Michael P. Stanley; Jean-Paul A. Nasser

(57) ABSTRACT

A device for terminating a hybrid electrical/fiber optic cable at a connector comprising a clamp assembly affecting a swage lock on a k-tube to prevent movement of the k-tube within the connector and resultant damage to the optical fibers. The clamp assembly comprises two clamp halves, at least one of which includes a k-tube groove, one or more optical fiber grooves, a fan out cavity, and means for joining the clamp halves. When the clamp halves are joined, the k-tube grooves form an enclosed k-tube channel that is slightly smaller than the outside diameter of the k-tube, thereby creating a swage lock to prevent movement of the k-tube. Similarly, the optical fiber grooves create a swage lock on protective plastic tubes that are placed over the optical fibers as they exit and fan out from the k-tube in the fan out cavity.

10 Claims, 7 Drawing Sheets

TERMINATION CLAMP ASSEMBLY FOR A HYBRID ELECTRICAL/FIBER OPTIC CABLE

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION

1. Field of the Invention

This invention relates generally to fiber optic cable equipment and, more particularly, to cable terminations for hybrid electrical/fiber optic cables.

2. Description of the Prior Art

In typical applications where optical fibers are used, these fibers are combined with standard electrical wires to create hybrid electrical/fiber optic cables. These hybrid cables provide the optical fibers with the benefit of the electrical wires' relatively greater strength, and provide the further advantage that multiple wires are combined into a single, easily handled cable, thus requiring, e.g., fewer cable penetrations through the walls of a building, fewer wire hangers, and fewer man-hours to run the wires throughout the installation site. In the typical installation, the optical fibers are encased within a flexible, stainless steel "k-tube" which provides further support and protection to the fragile fibers. This k-tube is then encased with the electrical wires inside the hybrid cable.

When it is necessary, however, to terminate the hybrid cable, e.g., at a connection, the optical fibers must be separated from each other and from the electrical wires. A termination apparatus is required to "fan out" the optical fibers from the cable. Terminations of this type of hybrid cable typically include a transition where the optical fiber(s) exit the k-tube and enter protective plastic tube(s); the fibers must "fan out" from the k-tube. In previous terminations, this transition (or fan out) was accomplished by means of heat-shrink tubing and adhesive and the transition was potted with polyurethane in a connector shell.

The development of this invention was prompted by a series of failures wherein one or more optical fibers broke within a hybrid cable termination/connector. The breakage occurred during routine handling of the cable and was caused by movement of the end of the k-tube within the connector. The use of heat shrink tubing and adhesive and potting the termination inside the connector proved inadequate to stabilize the k-tube, which pushed through the potting, thereby causing the optical fibers to break. Before the present invention, there was no effective way to immobilize the k-tube and control the fan out in these hybrid cable terminations.

SUMMARY OF THE INVENTION

It is therefore an object of the present invention to provide a simple and convenient means to terminate a hybrid electrical/fiber optic cable at a connector while further providing a secure and robust transition of the optical fibers from within a k-tube to individual protective plastic tubes.

It is therefore a further object of the present invention to provide a convenient means to manage the electrical wires and support the cable clamp assembly during the process of installing the connector.

The present invention provides a simple and convenient means to terminate a hybrid electrical/fiber optic cable at a connector while further providing a secure and robust transition of the optical fibers from within a k-tube to individual protective plastic tubes. The end of the k-tube is held firmly in place within the connector and is thereby prevented from damaging or breaking the fragile optical fibers.

Specifically, the k-tube is prevented from damaging or breaking the optical fibers by creating a swage lock on the k-tube between two halves of a clamp assembly. This swage lock prevents the k-tube from moving relative to the optical fibers that emerge from within the k-tube. A fan out chamber is located in the interior of the clamp assembly to allow the optical fibers to fan out from the k-tube. A protective plastic tube is placed over each individual optical fiber as it exits the clamp assembly. The plastic tubes are held in place as they exit the clamp assembly by swage locks created in a similar manner as for the k-tube. The swage locks are accomplished by placing the k-tube and plastic tubes within relatively shallow grooves in the mating surfaces of one or both of the half bodies of the clamp assembly and joining the halves together, thereby slightly compressing the k-tube and plastic tubes within their respective grooves.

A least one of the clamp assembly halves has one or more longitudinal passages through which the electrical wires of the hybrid cable can pass. An advantage of this feature of the invention is that the electrical wires passing through the passages can support the clamp assembly halves while the k-tube and optical fibers are being positioned in the clamp assembly and while the clamp assembly halves are being joined.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENT

FIGS. 1–5 depict the preferred embodiment of the invention, which is a cable termination clamp assembly 10 for use with a hybrid cable comprising one k-tube with two optical fibers and a plurality of electrical wires (not shown). In the preferred embodiment of the invention, the clamp assembly 10 is proportioned so that its length is nearly equal to its width. It will be apparent from the following description that the present invention may be modified for use with hybrid cables comprising more than one k-tube and any number of optical fibers and electrical wires.

Figure 3:
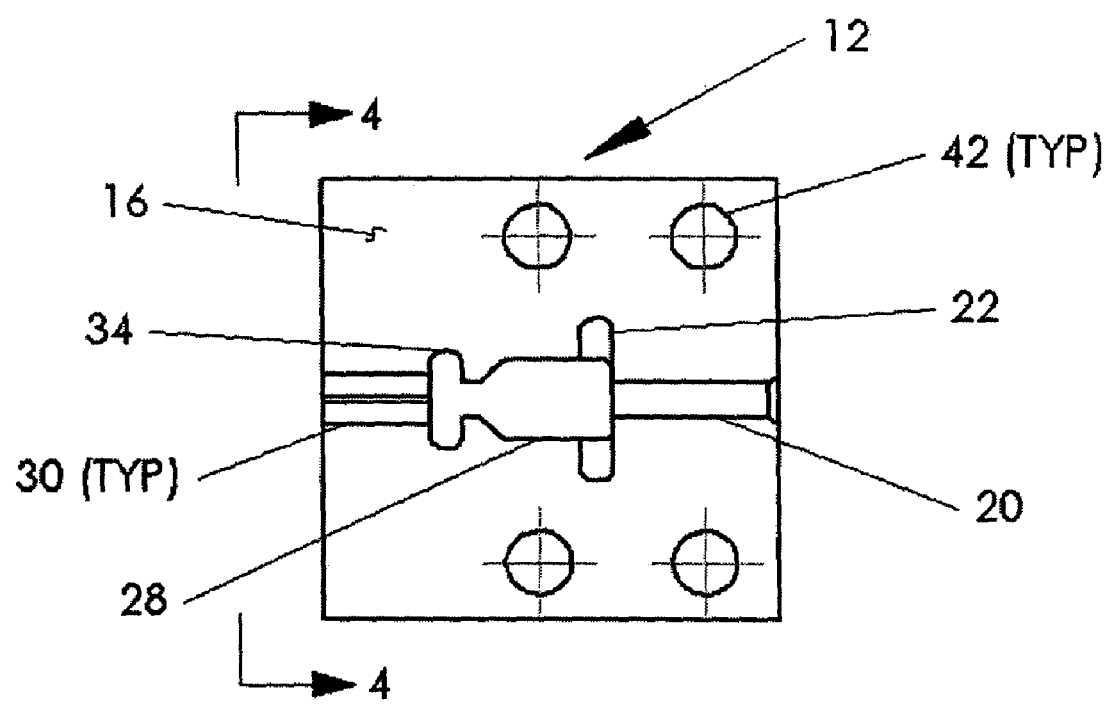
FIG. 3 depicts a plan view of a first clamp body half of the present invention.
Figure 5:
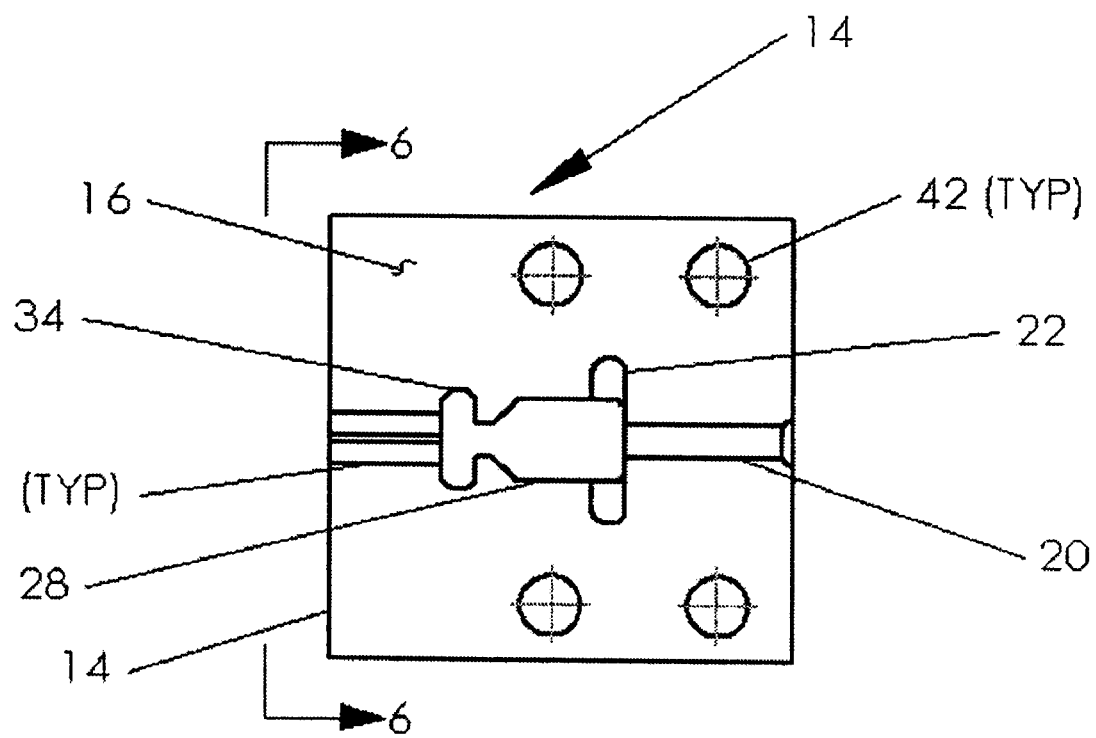
FIG. 5 depicts a plan view of a second clamp body half of the present invention.

The clamp assembly 10 comprises two clamp body halves 12 and 14 having mating surfaces 16 and 18, respectively (see FIGS. 3 and 5). Referring to FIG. 3, the k-tube 100 (not shown in this figure for clarity and for depiction of structure of the clamp) is positioned in a preferably semi-cylindrical k-tube groove 20 of the clamp body half 12 so that the end of the k-tube 100 is within the guide mark region 22. The guide mark region 22 provides a visual indication to the assembler that the k-tube 100 is properly positioned in the k-tube groove 20. The guide mark region 22 can be etched or otherwise cut or molded into the surface of clamp body half 12, as shown in FIGS. 3 and 5, or it can be marked with ink, paint or equivalent marking means.

As shown in FIG. 5, the clamp body half 14 has a k-tube groove 20 and guide mark region 22 similar to those on the clamp body half 12. When the clamp body half 12 is positioned over clamp body half 14 and the clamp body halves are joined together, the k-tube 100 is captured within the assembly. This capture occurs because the diameter of a k-tube channel 24 formed by k-tube grooves 20 of the two clamp body halves 12 and 14, is slightly smaller than the outside diameter of the k-tube 100 (See FIG. 1). In typical use, the diameter of each of the k-tube grooves 20 is 4% to 5% smaller than the diameter of the k-tube 100. Joining the clamp body halves 12 and 14 together creates a swage lock of the clamp assembly 10 onto the k-tube 100. Four (4) screws 26 or similar mechanical fasteners are used to fasten the clamp body halves 12 and 14 together. Laboratory tests have demonstrated that the resulting swage lock will sustain a linear force during typical operations.

Figure 1:
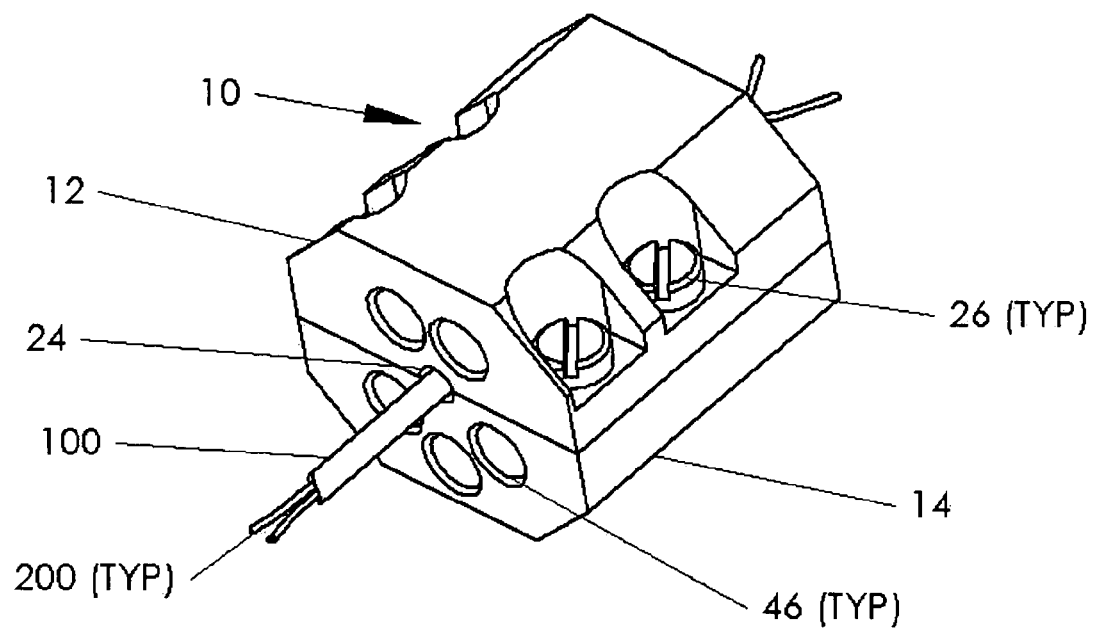
FIG. 1 depicts an isometric view of the assembled termination clamp assembly of the present invention.
Figure 2:
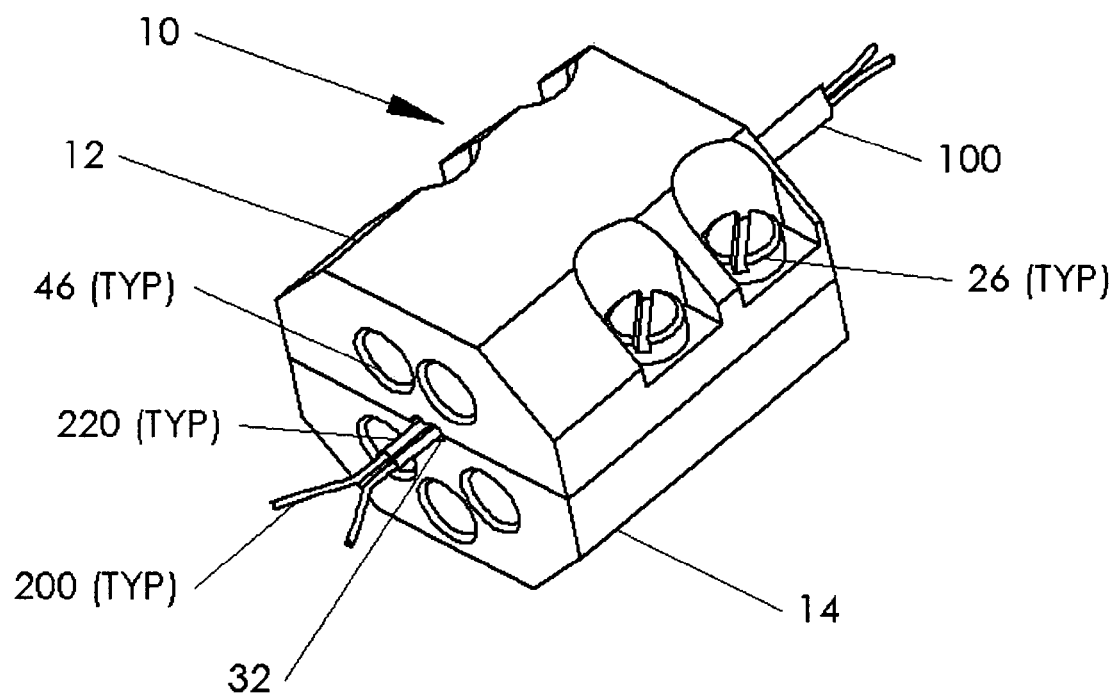
FIG. 2 depicts an alternate isometric view of the assembled termination clamp assembly of the present invention.
Figure 7:
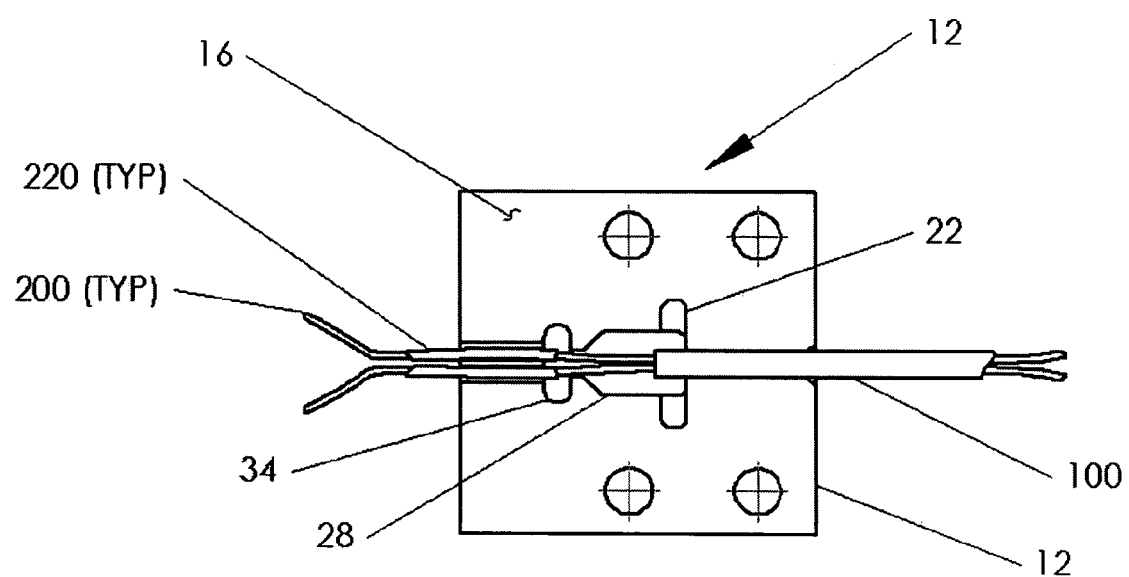
FIG. 7 depicts a plan view of the first clamp body half of the present invention with a k-tube, optical fibers, and plastic tubes in position during assembly of the termination clamp assembly.

As shown in FIG. 7, two optical fibers 200 emerge from the end of the k-tube 100 within a fan out cavity 28. These fibers are routed through individual protective plastic tubes 220 which are placed in separate, preferably semi-cylindrical, fiber grooves 30 in the clamp body halves 12 and 14. The fiber grooves 30 capture the plastic tubes 220 in a swage lock during assembly in the same way that the k-tube 100 is captured by the k-tube grooves 20 when clamp body halves 12 and 14 are joined. Preferably, the fiber grooves 30 are sized so that the swage lock is tight enough to prevent the plastic tubes 220 from moving while still allowing the optical fibers 200 to move within the plastic tubes 220. FIG. 2 shows the cylindrical fiber channels 32 formed by the fiber grooves 30 that capture the individual plastic tubes 220.

Referring again to FIGS. 3, 5 and 7, each clamp body half 12 and 14 has a fan out cavity 28 disposed within the center of its respective mating surface 16 and 18. These fan out cavities 28 are configured so that they form a fan out chamber (not shown) when the clamp body halves 12 and 14 are fastened together. Bumpers 34 are located on the interior wall of each fan out cavity 28 near the end where the fiber grooves 30 are located. The bumpers 34 provide the user with a tactile means to verify that the plastic tubes 220 are properly and fully positioned within the clamp assembly 10. They also prevent the plastic tubes 220 from protruding into the fan out cavity 28 where the optical fibers 200 fan out from the end of the k-tube 100 to the plastic tubes 220. During assembly, while the screws 26 are within a turn of being fully tightened, the protective plastic tubes 220 are loosely positioned within the channels 32 formed by the fiber grooves 30. This feature allows the assembler to move the plastic tubes 220 within the channels 32 and feel when they hit the bumper 34.

Threaded holes 40 are provided in clamp body half 14 and clearance holes 42 are provided in clamp body half 12. The holes 40 and 42 are sized to receive the screws 26 to thereby fasten the two clamp body halves 12 and 14 together. As shown in FIGS. 3 and 5, the clearance holes 42 and the threaded holes 40 are located along the edges of the clamp body halves 14 and 12 near where the k-tube 100 is positioned. This location of the holes ensures maximum clamping force of the clamp body halves 12 and 14 onto the k-tube 100 when the screws 26 are tightened into the holes.

Figure 4:
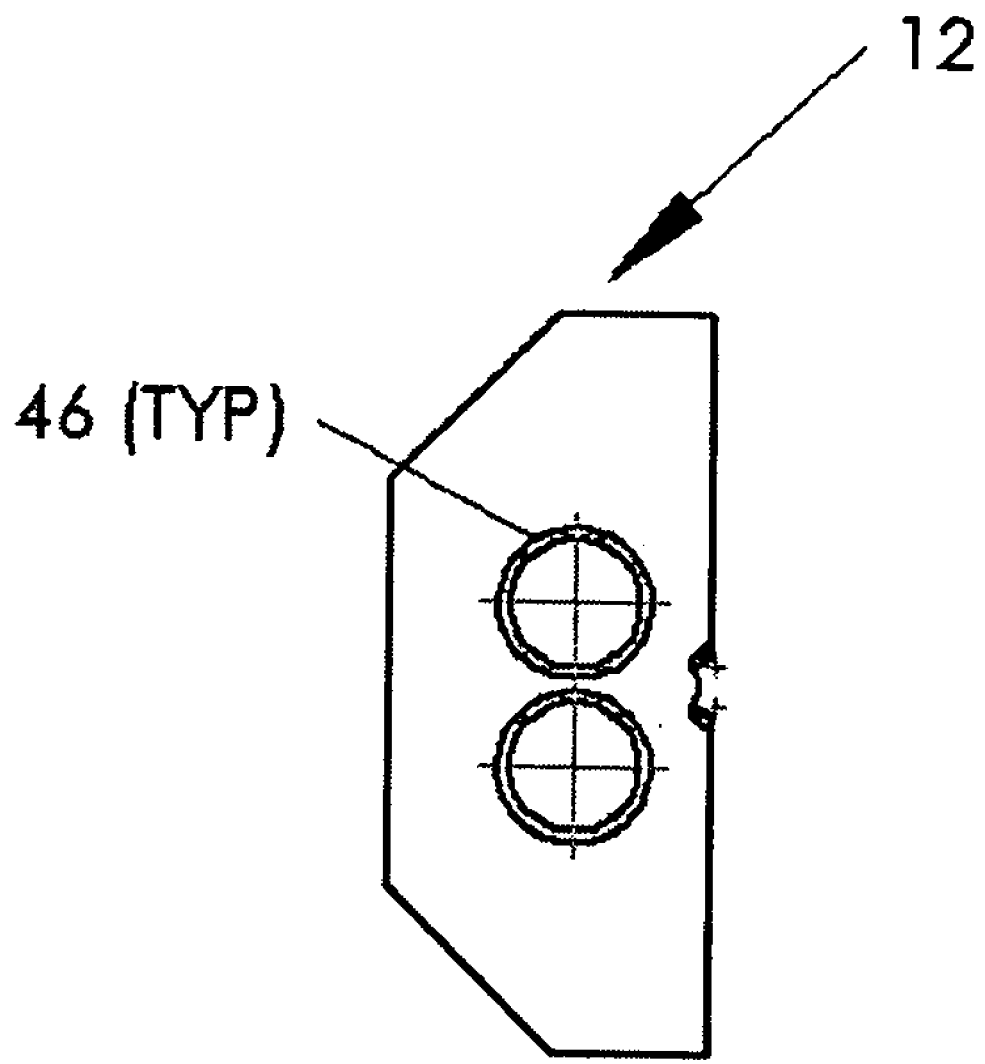
FIG. 4 depicts an end view of the first clamp body half of the present invention with the view taken from reference line 4—4 of FIG. 3.
Figure 6:
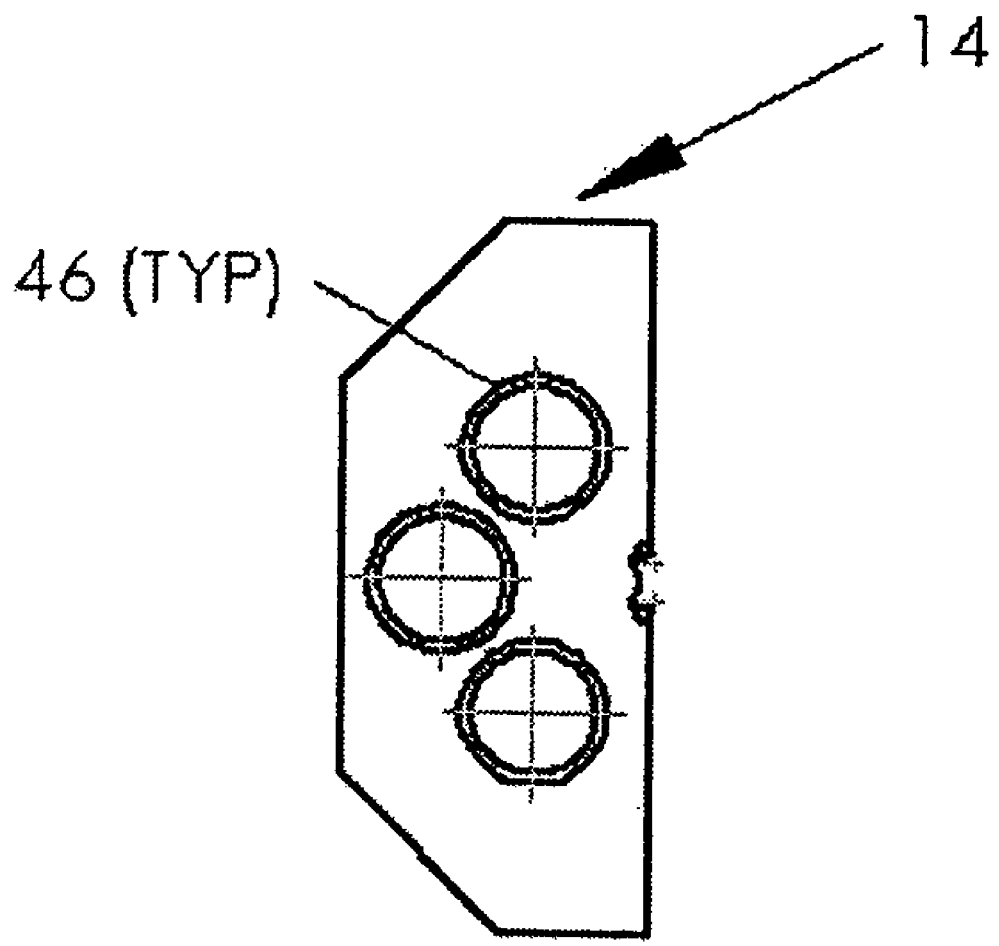
FIG. 6 depicts an end view of the second clamp body half with the view take from reference line 6—6 of FIG. 5 of the present invention.

As shown in FIGS. 4 and 6, a plurality of longitudinal wire passages 46 provides passage for the electrical wires (not shown) of the hybrid cable. During assembly of the present invention, the clamp body halves 12 and 14 are slid onto the electrical wires, which then act together as an assembly aid by supporting the clamp body halves 12 and 14 while the k-tube 100 and plastic tubes 220 are positioned properly into their respective grooves 20 and 30.

An advantageous feature of the preferred embodiment is its ability to prevent a viscous liquid such as a potting material from entering the fan out cavity 28 and contacting the exposed optical fibers 200. The compression fit of the clamp assembly 10 around both the k-tube 100 and the plastic tubes 220 is sufficient to prevent a viscous fluid from penetrating into the fan out cavity 28 along either the k-tube grooves 20 or the fiber grooves 30. When the clamp body halves 12 and 14 are tightly joined together, the flat mating surfaces 16 and 18 also form a mechanical seal that is sufficient to prevent viscous fluids from entering the fan out cavity 28. This seal is advantageous because it allows the cable clamp assembly 10, the k-tube 100 and electrical wires, to be "potted" within a cable grip using polyurethane or epoxy resin. This potting, when adhered to both the cable grip and the clamp assembly, immobilizes the assembly and, therefore, also the captured k-tube 100.

In practice, the preferred method of assembling and using the present invention at the termination of a hybrid electrical/fiber optic cable begins with separating the k-tube 100 from the electrical wires in the cable. One or more of the electrical wires are passed through the wire passage(s) 46 in clamp body half 12 and at least one other electrical wire is passed through a wire passage 46 in clamp body half 14. The electrical wires can then support the clamp body halves 12 and 14 during the remainder of the clamp assembly process.

The k-tube 100 is trimmed back so that the ends of the optical fibers 200 protrude from the end of the k-tube. The k-tube 100 is then placed in the k-tube groove 20 of clamp body half 12 so that the end of the k-tube is adjacent to the guide mark region 22 on the mating surface 16 of clamp body half 12. A protective plastic tube 220 is slid over the portion of each of the optical fibers 200 that is outside of the k-tube 100. Each of the plastic tubes is then placed within a fiber groove 30 in the clamp body half 12.

At this point, the clamp body half 14 is positioned over the clamp body half 12 so that the mating surfaces 16 and 18 of the clamp body halves 12 and 14 are flush against each other in parallel contact, the k-tube 100 is inside k-tube groove 20 of clamp body half 14, and each of the plastic tubes 220 is inside one of the fiber grooves 30 in clamp body half 14. The screws 26 are inserted into clearance holes 42 and partially screwed into threaded holes 46 to hold the mating surfaces 16 and 18 in close proximity to each other and to loosely clamp the k-tube 100 and plastic tubes 220 in place, yet allow the plastic tubes 220 to be manually moved longitudinally (i.e., along the length of the fiber groove 30) within the fiber grooves 30 by the assembler.

After the screws 26 are partially screwed into the threaded holes 46 as described above, each plastic tube 220 is moved longitudinally until the assembler feels the end of the plastic tube touch one of the bumpers 34 in the fan out chamber 28. This indicates to the assembler that the plastic tube 220 is fully inserted into the clamp assembly. When all of the plastic tubes 220 are so positioned, the screws 26 are further tightened as necessary to create a firm swage lock of the clamp body halves 12 and 14 onto the k-tube 100 and plastic tubes 220. The resultant cable clamp assembly 10, and the k-tube 100, optical fibers (in their protective plastic tubes) and electrical wires, are now ready to be potted within a cable grip using polyurethane, epoxy resin, or other viscous potting compound.

In one alternative embodiment of the invention, only one of the clamp body halves 12 and 14 has the fiber grooves 30. In this embodiment, the fiber grooves 30 in the second clamp body half will necessarily be deeper to accommodate nearly the entire diameter of the plastic tubes 220, yet remain small enough to provide the swage lock required to hold the plastic tubes 220 in place.

In yet another alternative embodiment of the invention, one of the clamp body halves 12 and 14 has only a flat mating surface, without a k-tube groove, fiber grooves, or a fan out cavity. In that embodiment, the second clamp body half will necessarily have a deeper k-tube groove to accommodate nearly the entire diameter of the k-tube 100 and deeper fiber grooves to accommodate nearly the entire diameter of the plastic tubes 220. Again, the grooves will still have to be small enough to provide the swage lock required to hold the k-tube 100 and plastic tubes 220 in place.

While the above discussion describes the preferred embodiment of the invention and some alternative embodiments, it should be understood that they have been presented by way of example and not limitation. It will become apparent to those skilled in the art that equivalent alternative embodiments and alternative methods are possible. It is intended that all such alternative embodiments and methods shall be covered by the claims set forth herein.

What is claimed is:

1. A termination clamp assembly for cables containing at least one optical fiber within a metallic k-tube, said termination clamp assembly comprising:
   a first clamp body half, said first clamp body half including a first mating surface on one side of said first clamp body half with a first fan out cavity defined in said first mating surface, a first k-tube groove defined in said first mating surface that is hemi-cylindrical and extending from a first end of said first clamp body half and terminating at said first fan out cavity with said first clamp body half further including at least one fiber groove defined in said first mating surface and extending from said first fan out cavity to a second end of said first clamp body half;
   a second clamp body half having a second mating surface on one side of said second clamp body half, said second mating surface cooperating with said first mating surface when said first and second mating surfaces are joined to define an interior fan out chamber and capable of creating a swage lock on a k-tube placed within said first k-tube groove and creating swage locks on plastic tubes placed within said at least one fiber groove; and
   a means for joining said first and second mating surfaces.

2. The termination clamp assembly of claim 1, wherein said second clamp body half further includes:
   a second fan out cavity defined in said second mating surface, said second fan out cavity cooperating with said first fan out cavity when said first and second mating surfaces are joined to define an interior fan out chamber; and
   a second hemi-cylindrical k-tube groove defined in said second mating surface and extending from a first end of said second clamp body half and terminating at said second fan out cavity, said second k-tube groove suitable for cooperating with said first k-tube groove when said first and second mating surfaces are joined to create a swage lock on a k-tube placed within said first and second k-tube grooves.

3. The termination clamp assembly of claim 2, wherein said second clamp body half further includes at least one fiber groove formed therein extending from said second fan out cavity to a second end of said second clamp body half, said at least one fiber groove in said second clamp body half suitable for cooperating with said at least one fiber groove in said first clamp body half when said first and second mating surfaces are joined to create swage locks on plastic tubes placed within said fiber grooves.

4. The termination clamp assembly of claim 1, wherein at least one of said first and second clamp body halves has at least one wire passage extending longitudinally through said clamp body half suitable for receiving an electrical wire that passes through and supports said clamp body half during assembly.

5. The termination clamp assembly of claim 4, wherein at least one bumper is disposed on the interior wall of said first fan out cavity proximate to said at least one fiber groove in said first clamp body half.

6. The termination clamp assembly of claim 5, wherein said first clamp body half includes a guide mark region defined on said first mating surface proximate to the juncture of said first k-tube groove and said first fan out cavity.

7. The termination clamp assembly of claim 6, wherein said means for joining comprises at least one screw inserted into screw holes formed in said first and second clamp body halves.

8. A termination clamp assembly for cables containing at least one optical fiber within a k-tube, said clamp assembly comprising:
   a first clamp body half, said first clamp body half including a first mating surface on one side of said first clamp body half and a first fan out cavity defined in said first mating surface with a first k-tube groove defined in said first mating surface and extending from a first end of said first clamp body half and terminating at said first fan out cavity, at least one fiber groove defined in said first mating surface and extending from said first fan out cavity to a second end of said first clamp body half, at least one bumper disposed on the interior wall of said first fan out cavity proximate to said fiber groove in said first mating surface, a guide mark region defined on said first mating surface proximate to the juncture of said first k-tube groove and said first fan out cavity and at least two threaded holes formed in the perimeter of and substantially perpendicular to said first mating surface proximate to said first k-tube groove;
   a second clamp body half, said second clamp body half including a second mating surface on one side of said second clamp body half, a second fan out cavity defined in said second mating surface and cooperating with said first fan out cavity to define an enclosed fan out chamber when said first and second mating surfaces are joined, a second k-tube groove defined in said second mating surface and extending from a first end of said second clamp body half and terminating at said second fan out cavity, said second k-tube groove suitable for cooperating with said first k-tube groove to create a swage lock on a k-tube placed in said first and second k-tube grooves, at least one fiber groove defined in said second mating surface and extending from said second fan out cavity to a second end of said second clamp body half, each fiber groove in said second mating surface suitable for cooperating with a fiber groove in said first mating surface to create a swage lock on a plastic tube placed in said fiber grooves, at least one bumper disposed on the interior wall of said second fan out cavity proximate to said fiber groove in said second mating surface; and at least two clearance holes formed in the perimeter of and substantially perpendicular to said second mating surface near said second k-tube groove;

at least one wire passage extending longitudinally through at least one of said clamp body halves, said wire passages suitable for receiving electrical wires that pass through and support said clamp body half; and at least one screw threaded to fit into each of said threaded holes and each of said clearance holes in order to fixedly join said first and second mating surfaces.

9. The termination clamp assembly of claim 8, further comprising:

means for visually indicating the proper position of the k-tube on one of said first or second mating surfaces before said first and second mating surfaces are joined.

10. The termination clamp assembly of claim 8, further comprising:

means for tactilely indicating the proper position of the plastic tubes between said first and second mating surfaces before said first and second mating surfaces are joined.

* * * * *